(12) United States Patent
Karjalainen et al.

(10) Patent No.: US 12,399,250 B2
(45) Date of Patent: Aug. 26, 2025

(54) SYSTEM AND METHOD FOR ENHANCED UE POSITIONING USING MULTI-SOURCE PRS

(71) Applicant: Nokia Technologies Oy, Espoo (FI)

(72) Inventors: Juha Pekka Karjalainen, Oulu (FI); Timo Koskela, Oulu (FI); Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 388 days.

(21) Appl. No.: 18/005,319

(22) PCT Filed: Jul. 8, 2021

(86) PCT No.: PCT/EP2021/068979
§ 371 (c)(1),
(2) Date: Jan. 12, 2023

(87) PCT Pub. No.: WO2022/028808
PCT Pub. Date: Feb. 10, 2022

(65) Prior Publication Data
US 2023/0258761 A1    Aug. 17, 2023

(30) Foreign Application Priority Data
Aug. 3, 2020 (EP) .................................... 20189078

(51) Int. Cl.
*H04W 64/00* (2009.01)
*G01S 5/02* (2010.01)

(52) U.S. Cl.
CPC ............ *G01S 5/0226* (2013.01); *G01S 5/021* (2013.01)

(58) Field of Classification Search
CPC . H04W 64/00; H04W 72/0446; H04W 4/029; H04W 24/10; H04W 24/08;
(Continued)

(56) References Cited

U.S. PATENT DOCUMENTS 9,385,910 B2    7/2016  Lee et al.
9,594,149 B2 *  3/2017  Siomina .............. G01S 5/02524
(Continued)

FOREIGN PATENT DOCUMENTS

EP          3335483 B1    4/2020
WO    2017/030488 A1    2/2017
(Continued)

OTHER PUBLICATIONS

Office Action received for corresponding European Patent Application No. 20189078.7, dated Feb. 26, 2024, 8 pages.
"New SID on NR Positioning Enhancements", 3GPP TSG RAN Meeting #86, RP-193237, Agenda Item: 9.1.1, Qualcomm Incorporated, Dec. 9-12, 2019, 4 pages.
"3rd Generation Partnership Project; Technical Specification Group Radio Access Network; NR; Physical layer procedures for data (Release 16)", 3GPP TS 38.214, V16.0.0, Dec. 2019, pp. 1-148.
(Continued)

*Primary Examiner* — Quan M Hua
(74) *Attorney, Agent, or Firm* — Carter, DeLuca & Farrell LLP (57) ABSTRACT

A terminal node for a radio network comprising means for: receiving multiple positioning reference signals transmitted from respective transmission reception points of a network; determining time of arrival of the multiple positioning reference signals received from the respective transmission reception points; measuring at least a received signal quality metric for the multiple received positioning reference signals; processing, at least the multiple respective received signal quality metrics for the multiple received positioning reference signals, to trigger a received signal quality decision; and in response to the received signal quality decision, informing the network. A node of a radio network comprising means for: enabling transmission of multiple positioning reference signals from respective transmission reception points of a network; being informed of a received signal quality decision made at the terminal node in respect of measured received signal quality metrics for the transmitted positioning reference signals received at the terminal node;
(Continued)

and in response, causing adaptation of transmission of signals in the network.

1 Claim, 6 Drawing Sheets

(58) Field of Classification Search
CPC ... H04W 16/28; H04W 64/006; H04W 72/21; H04W 72/56; H04W 48/12; H04W 56/00; H04W 56/001; H04W 64/003; H04W 56/006; H04L 5/0048; H04L 5/0007; H04L 5/001; H04L 5/0094; H04L 5/0091; H04L 5/0051; H04L 5/0053; H04L 5/005; G01S 1/0428; G01S 1/20; G01S 5/10
See application file for complete search history.

(56) References Cited

U.S. PATENT DOCUMENTS

| | | | |
|---|---|---|---|
| 9,756,599 | B2 | 9/2017 | Fischer |
| 2011/0205914 | A1 | 8/2011 | Krishnamurthy et al. |
| 2015/0296359 | A1 | 10/2015 | Edge |
| 2015/0365790 | A1 | 12/2015 | Edge et al. |
| 2018/0054286 | A1 | 2/2018 | Tang et al. |
| 2019/0364570 | A1 | 11/2019 | Kumar et al. |
| 2021/0320769 | A1* | 10/2021 | Cha ................. H04W 48/12 |
| 2021/0333353 | A1* | 10/2021 | Busin ................ G01S 5/0278 |
| 2022/0373635 | A1* | 11/2022 | Bao ................. H04W 64/00 |

FOREIGN PATENT DOCUMENTS

| | | |
|---|---|---|
| WO | 2020/026211 A1 | 2/2020 |
| WO | 2020/067840 A1 | 4/2020 |
| WO | 2020/067964 A1 | 4/2020 |

OTHER PUBLICATIONS

"On Demand Transmission of PRS for NR", 3GPP TSG-RAN WG2 Meeting #105, R2-1901373, Agenda Item: 11.8.2, Qualcomm Incorporated, Feb. 25-Mar. 1, 2019, pp. 1-15.

"Co-ordination among UE, gNB and Location Server for PRS Configuration and Feedbacks", 3GPP TSG RAN WG2#105, R2-1901533, Agenda Item: 11.8.3, Ericsson, Feb. 25-Mar. 1, 2019, 3 pages.

"3rd Generation Partnership Project; Technical Specification Group Radio Access Network; NR; Physical layer measurements (Release 16)", 3GPP TS 38.215, V16.1.0, Mar. 2020, pp. 1-22.

"On-demand and dynamic PRS configuration for DL-TDOA", 3GPP TSG-RAN WG2 Meeting #108, R2-1916106, Agenda Item: 6.8.2.1, Nokia, Nov. 18-22, 2019, 5 pages.

"Measurements for PRS on-demand", 3GPP TSG RAN WG1 #96bis, R1-1905265, Agenda Item: 7.2.10.4, Nokia, Apr. 8-12, 2019, 3 pages.

"Dynamic PRS configuration for DL-TDOA positioning", 3GPP TSG-RAN WG2 Meeting #106, R2-1907657, Agenda Item: 11.8.2.1, Nokia, May 13-17, 2019, 3 pages.

"Impact of Indoor Positioning Enhancement on TS 36.133 RRM Requirements", 3GPP TSG-RAN WG4 Meeting #76bis, R4-155931, Agenda Item: 7.48.4, Alcatel-Lucent, Oct. 12-16, 2015, 4 pages.

Extended European Search Report received for corresponding European Patent Application No. 20189078.7, dated Jan. 20, 2021, 13 pages.

"3rd Generation Partnership Project; Technical Specification Group Radio Access Network; LTE Positioning Protocol (LPP) (Release 16)", 3GPP TS 37.355, V16.0.0, Mar. 2020, pp. 1-281.

International Search Report and Written Opinion received for corresponding Patent Cooperation Treaty Application No. PCT/EP2021/068979, dated Oct. 18, 2021, 17 pages.

* cited by examiner

SYSTEM AND METHOD FOR ENHANCED UE POSITIONING USING MULTI-SOURCE PRS

RELATED APPLICATION

This application was originally filed as PCT Application No. PCT/EP2021/068979, filed on Jul. 8, 2021, which claims priority from EP Application Serial No. 20189078.7, filed on Aug. 3, 2020, each of which is incorporated herein by reference in its entirety.

TECHNOLOGICAL FIELD

Embodiments of the present disclosure relate to positioning. Some relate to positioning a user equipment in a 3GPP telecommunications network.

BACKGROUND

It can be desirable to determine a position (location) of an apparatus. On way to position an apparatus that can receive radio signals is to transmit beacons (e.g. positioning reference signals) from known positions (e.g. from transmission reception points).

The length of a radio path from the transmission reception point to the apparatus is proportional to a time of flight of the positioning reference signal between the transmission reception point and the apparatus.

A difference in path length of radio paths from different transmission reception points to the apparatus is proportional to the different time of flights of respective positioning reference signals between the respective transmission reception points and the apparatus.

Where the respective positioning reference signals are transmitted simultaneously or with a known time offset, then a difference in the time of arrival of the respective positioning reference signals encodes a difference in path length of radio paths from the respective different transmission reception points.

An observed time difference of arrival (OTDA) for respective positioning reference signals indicates relative differences in path lengths between respective transmission reception points.

Expressed as a multi-lateration problem, a solution to the problem provides a previously unknown location of the terminal node.

BRIEF SUMMARY

According to various, but not necessarily all, embodiments there is provided a terminal node for a radio network comprising means for:
  receiving multiple positioning reference signals transmitted from respective transmission reception points of a network;
  determining time of arrival of the multiple positioning reference signals received from the respective transmission reception points;
  measuring at least a received signal quality metric for the multiple received positioning reference signals;
  processing, at least the multiple respective received signal quality metrics for the multiple received positioning reference signals, to trigger a received signal quality decision; and
  in response to the received signal quality decision, informing the network.

In some but not necessarily all examples, the terminal node comprises:
  means for configuring a first antenna port to receive a first positioning reference signal from a first transmission reception point of the network, means for determining a time of arrival for the first positioning reference signal, and means for measuring a received signal quality metric of the first positioning reference signal for the first antenna port; and
  means for configuring a second antenna port to receive a second positioning reference signal from a second transmission reception point of the network, means for determining a time of arrival for the second positioning reference signal, and means for measuring a received signal quality metric of the second positioning reference signal for the second antenna port.

In some but not necessarily all examples, the triggered received signal quality decision causes the terminal node to switch from using a first antenna panel for the first positioning reference signal to using a different antenna panel for the first positioning reference signal.

In some but not necessarily all examples, the received signal quality metric for a positioning reference signal is dependent upon a reference signal received power for the positioning reference signal and/or a signal to interference noise ratio for the positioning reference signal.

In some but not necessarily all examples, processing, at least the multiple respective received signal quality metrics for the multiple received positioning reference signals, to trigger a received signal quality decision comprises determining whether a received signal quality criterion or criteria have been met.

In some but not necessarily all examples, processing, at least the multiple respective received signal quality metrics for the multiple received positioning reference signals, to trigger a received signal quality decision comprises classifying the multiple positioning reference signals into at least one or more of the following classes in which a received signal quality metric for the positioning reference signal is:
  i) above a first threshold
  ii) below the first threshold and above a second threshold
  iii) below the second threshold.

In some but not necessarily all examples, informing the network comprises identifying at least one or more positioning reference signals as being at least one of:
  good quality, requiring improvement, poor quality, interfering.

In some but not necessarily all examples, informing the network comprises requesting adaptation of at least one positioning reference signal.

In some but not necessarily all examples, informing the network comprises requesting adaptation of positioning reference signal resources.

According to various, but not necessarily all, embodiments there is provided a method comprising:
  receiving multiple positioning reference signals transmitted from respective transmission reception points of a network;
  determining time of arrival of the multiple positioning reference signals received from the respective transmission reception points;
  measuring at least a received signal quality metric for the multiple received positioning reference signals;
  processing, at least the multiple respective received signal quality metrics for the multiple received positioning reference signals, to trigger a received signal quality decision; and in response to the received signal quality decision, informing the network.

According to various, but not necessarily all, embodiments there is provided a computer program that when run by user equipment causes:
processing, at least multiple respective received signal quality metrics for multiple received positioning reference signals, to trigger a received signal quality decision,
wherein the multiple respective received signal quality metrics are measured from respective multiple received positioning reference signals transmitted from respective reference points of a network for respective time of arrival determination; and
in response to the received signal quality decision, informing the network.

According to various, but not necessarily all, embodiments there is provided a radio network comprising means for:
enabling transmission of multiple positioning reference signals from respective transmission reception points of a network;
being informed of a received signal quality decision made at a terminal node of a network in respect of measured received signal quality metrics for the transmitted positioning reference signals received at the terminal node; and
in response, causing adaptation of transmission of signals in the network.

In some but not necessarily all examples, causing adaptation of transmission of signals in the network comprises causing adaptation of transmission of multiple positioning reference signals that are transmitted from respective transmission reception points of the network.

In some but not necessarily all examples, causing adaptation of transmission of signals in the network comprises one or more of:
causing an increase of a repetition factor of a particular positioning reference signal,
where the repetition factor is a number of times the particular positioning reference signal is transmitted to the terminal node in a time period,
In some but not necessarily all examples, causing a reduction of a repetition gap of a particular positioning reference signal, where the repetition gap is a time offset between adjacent transmissions of the particular positioning reference signal to the terminal node in a time period,
causing muting of positioning reference signals,
causing allocation of aperiodic positioning reference signal resources,
causing adaptation of interfering transmissions in the network.

According to various, but not necessarily all, embodiments there is provided a method comprising:
enabling transmission of multiple positioning reference signals from respective transmission reception points of a network;
being informed of a received signal quality decision made at a terminal node of a network in respect of measured received signal quality metrics for the transmitted positioning reference signals received at the terminal node; and
in response, causing adaptation of transmission of signals in the network.

According to various, but not necessarily all, embodiments there is provided a computer program that when run by a network node of a network causes:
adaptation of transmission of signals in the network, in response to being informed of a received signal quality decision made at a terminal node of a network in respect of measured received signal quality metrics for multiple transmitted positioning reference signals, transmitted from multiple respective transmission reception points of the network.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
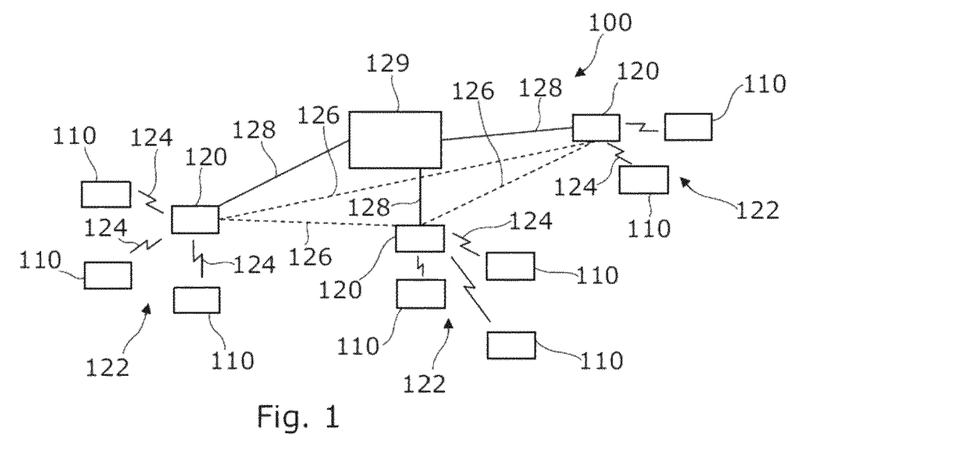
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 has a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In the particular example illustrated the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In another example the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

Figure 2:
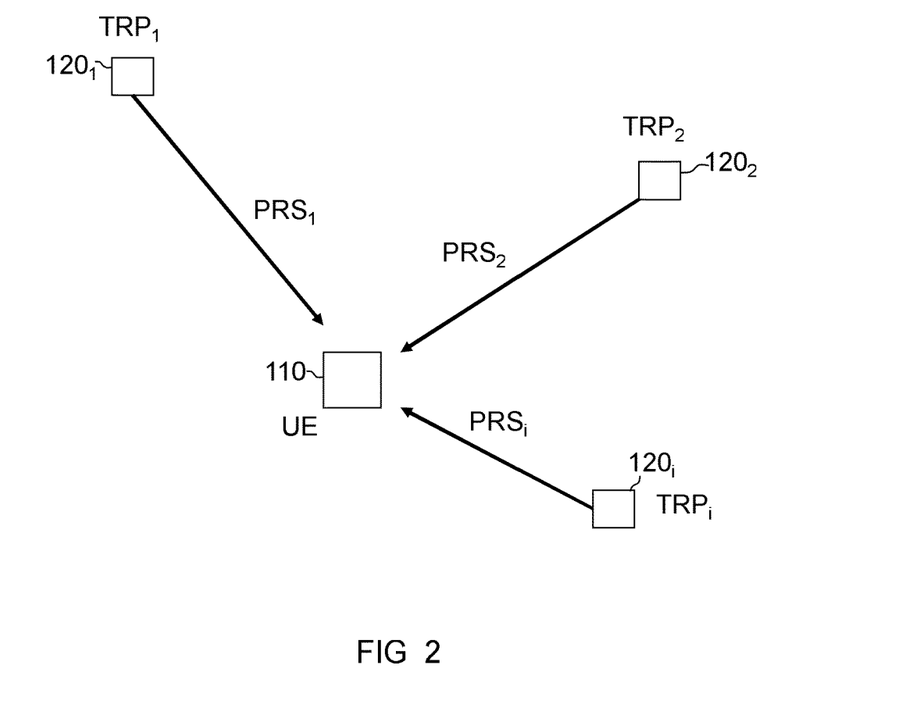
FIG. 2 shows another example of the subject matter described herein.

FIG. 2 illustrate an example of a positioning system. A transmission reception point (TRP) transmits a positioning reference signal (PRS). There are multiple transmission reception points (TRPs) and multiple respective transmitted positioning reference signals (PRSs). A terminal node 110 receives multiple positioning reference signals (PRSs) transmitted from respective transmission reception points (TRPs) of a network. The terminal node 110 is configured to determine time of arrival (TOA) of the multiple positioning reference signals (PRSs) received from the respective transmission reception points (TRPs). The terminal node 110 is also configured to use the time of arrivals (TOAs) to cause determination, at the terminal node 110 or the network, of a position of the terminal node 110.

The process of determining a position of a terminal node 110 based upon the measured relative time of arrivals (TOAs) has well known solutions in the art.

In the particular example illustrated in FIG. 2, the terminal node 110 is a user equipment (UE) of a network 100 as described with reference to FIG. 1. The transmission reception points (TRPs) can be provided by access nodes 120 of the cellular network 100. The access nodes 120 that operate as transmission reception points can, for example, be gNBs 120 of a NR radio access network 100.

The time of arrival of a PRS is measured, for example, at a start of a subframe. Uncertainty as to when a start of a subframe is received causes uncertainty in time of arrival (TOA). It would therefore be desirable to improve positioning by improving measurement accuracy of a time of arrival.

Figure 3A:
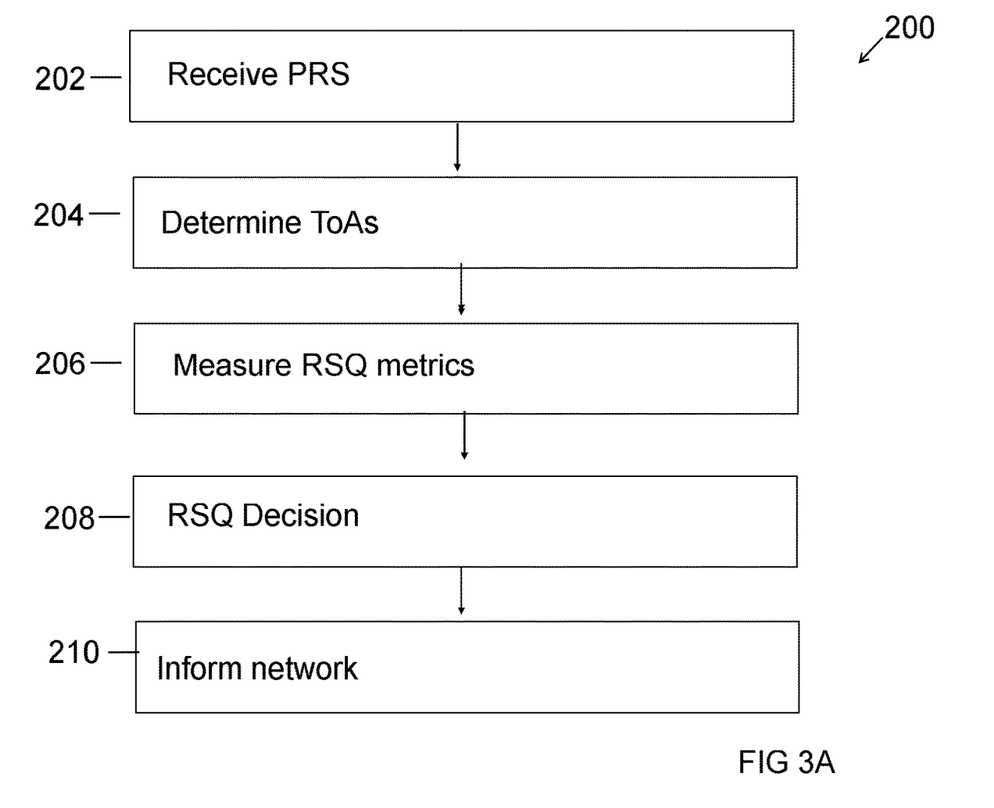
FIG. 3A shows another example of the subject matter described herein.

FIG. 3A illustrates an example of a method 200 that can, for example, be performed by the terminal node 110.

At block 202, the terminal node 110 receives multiple positioning reference signals (PRSs) transmitted from respective transmission reception points (TRPs) of a network.

At block 204, the terminal node 110 determines time of arrival (TOA) of the multiple positioning reference signals (PRSs) received from the respective transmission reception points (TRPs).

At block 206, the terminal node 110 measures at least a received signal quality (RSQ) metric for the multiple received positioning reference signals (PRSs).

At block 208, the terminal node 110 processes, at least the multiple respective received signal quality (RSQ) metrics for the multiple received positioning reference signals (PRSs), to trigger a received signal quality (RSQ) decision at the terminal node 110.

At block 210, the terminal node 110, in response to the received signal quality (RSQ) decision, made at block 208, informs the network.

The informing the network, which occurs at block 210, can, for example, comprise transmitting a message of a predefined format to an access node 120 of the network 100.

The access node 120 can, for example, be one of the transmission reception points (TRP) of the network 100 that transmit the positioning reference signal (PRS) received at block 202

Informing the network 100 enables the network to adapt transmission of (or improve reception of) multiple positioning reference signals (PRSs) from respective transmission reception points (TRPs) of the network 100. For example, one or more of the multiple positioning reference signals (PRSs) can be adapted. Additionally, or alternatively, one or more of the multiple transmission reception points (TRPs) can be adapted. Alternatively, or additionally, interference sources produced by the network 100 can be reduced.

In some, but not necessarily all examples the terminal node 110 is configured to inform the network at block 210 by requesting adaptation of positioning reference signal resources used by the network 100. The request can, for example, be a message of a predefined format that is transmitted to the network 100.

Figure 3B:
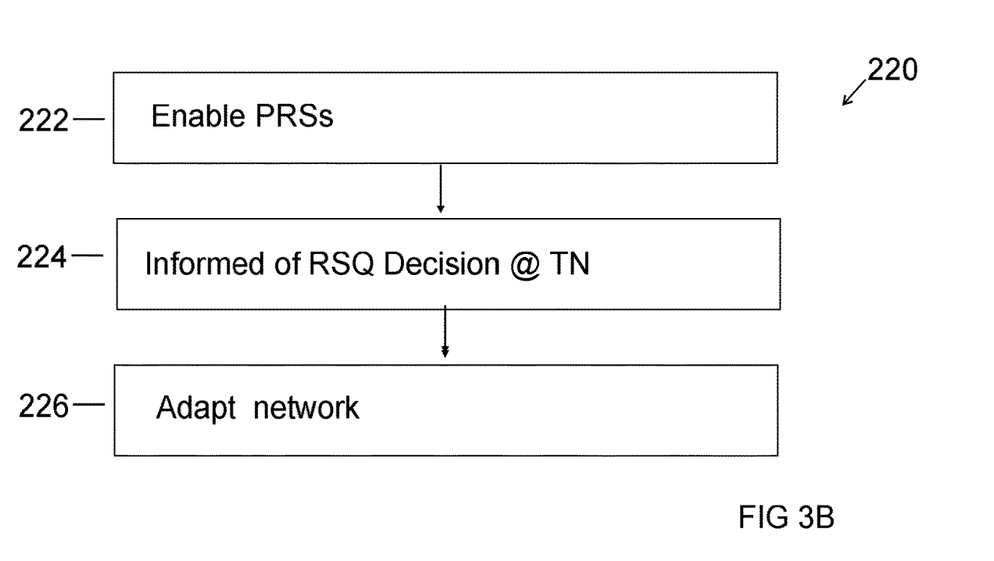
FIG. 3B shows another example of the subject matter described herein.

FIG. 3B illustrates an example of a method 220 that can, for example, be performed by a network node, for example a core node 129 that performs a location function.

The method 220 and method 200 together describe the method performed by the whole network. The method 200 describes the method performed at a terminal node 110 and the method 220 describes the corresponding method performed, at the same time, at a network node.

At block 222, the network node enables transmission of multiple positioning reference signals from respective transmission reception points of a network.

At block 224, the network node is informed of a received signal quality (RSQ) decision made at a terminal node 110 of a network 100 in respect of measured received signal quality metrics for the transmitted positioning reference signals received at the terminal node 100.

At block 226, the network node causes adaptation of transmission of signals in the network 100, in response to being informed of a received signal quality (RSQ) decision made at the terminal node 110 of the network 100 in respect of measured received signal quality (RSQ) metrics for the transmitted positioning reference signals (PRSs) received at the terminal node 110.

The time of arrival of a positioning reference signal (PRS) can, for example, be the time at which the terminal node 110 receives the corresponding start of a subframe from the respective positioning reference signal (PRS). The time of arrival can be determined in different ways.

In some, but not necessarily all examples, each positioning reference signal (PRS) comprises a correlation code that is known to the terminal node 110, for example based on signaling from the network 100. In this example, the terminal node 100 can be configured to correlate the received positioning reference signal (PRS) against an expected respective sequence for that positioning reference signal to determine a time of arrival for the respective positioning reference signal (PRS).

In some, but not necessarily all examples, a positioning reference signal (PRS) is specific to a cell of the network 100. In other examples, a positioning reference signal (PRS) can, for example, be specific to a terminal node 110. For example, the positioning reference signal (PRS) can be transmitted via a particular transmission beam that is directed in spatial domain towards the terminal node 110.

The received signal quality (RSQ) metric can, for example, be a measured quality of the positioning reference signal (PRS) itself as received at a particular time. Quality of the time of arrival for that positioning reference signal (PRS) can be inferred from the received signal quality (RSQ) metric.

In some examples, the received signal quality (RSQ) metric for a positioning reference signal (PRS) is dependent upon a reference signal received power (RSRP) for the positioning reference signal (PRS) and/or a signal to interference noise ratio (SINR) for the positioning reference signal (PRS).

Additionally, or alternatively, received signal quality (RSQ) metrics can be at least partially based upon an outcome of a correlation of a sequence against the received positioning reference signal (PRS). It can for example be based upon an auto-correlation peak of the received positioning reference signal (PRS) against its own sequence and/or based upon a cross-correlation peak of the received positioning reference signal (PRS) against a sequence associated with a different positioning reference signal (PRS).

Other measures such as received signal strength indicator (RSSI) can be used as a component of the received signal quality (RSQ) metric or used as the received signal quality (RSQ) metric.

Figure 4A:
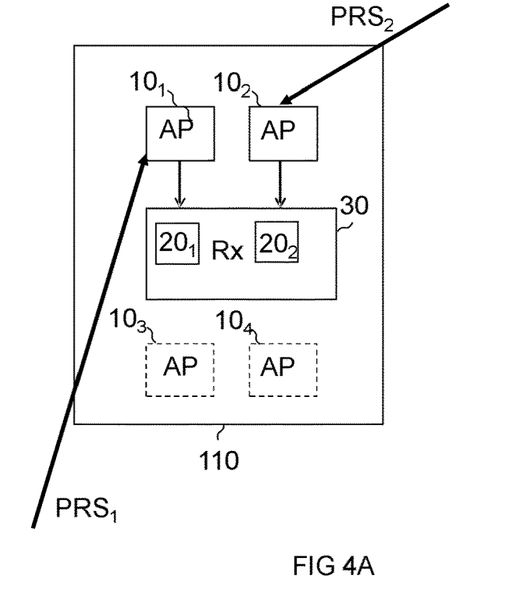
FIGS. 4A, 4B show another example of the subject matter described herein.
Figure 4B:
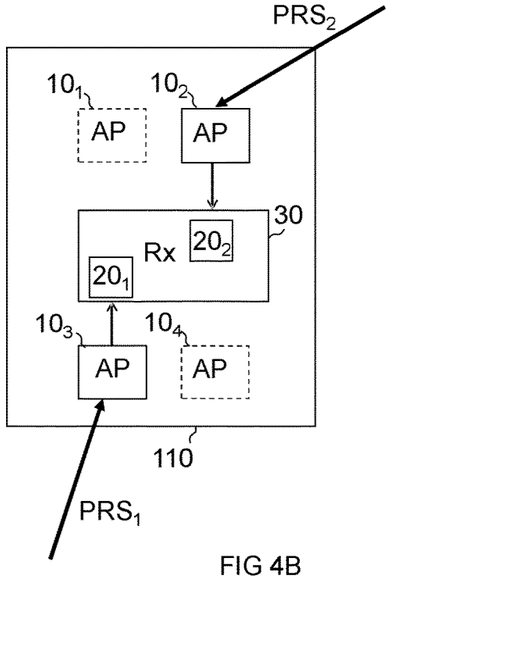

FIGS. 4A and 4B illustrate an example of a terminal node 110 that comprises reception circuitry 30 that receives positioning reference signals (PRSs) via different antenna ports 10. In the example of FIG. 4A, the terminal node 110 receives a first positioning reference signal ($PRS_1$) via a first antenna port $10_1$ and it receives a second positioning reference signal ($PRS_2$) via a second antenna port $10_2$. In FIG. 4B, the use of the antenna ports 10 has been changed and the mobile node 110 receives the first positioning reference signal ($PRS_1$) via a third antenna port $10_3$ which is different to the first antenna port $10_1$. The mobile node 110 receives the second positioning reference signal ($PRS_2$) via the second antenna port $10_2$.

In the examples of FIGS. 4A and 4B, the operational antenna ports are illustrated with solid lines and the non-operational antenna ports are illustrated with dashed lines. It can be seen that the first antenna port $10_1$ is operational in FIG. 4A but not operational in FIG. 4B and that the third antenna port $10_3$ is non-operational in FIG. 4A and is operational in FIG. 4B.

An antenna port is a logical entity rather than a physical antenna. Two transmission/receptions correspond to the same radio channel if and only if they use the same antenna port. Therefore, two signals transmitted using the same antenna panel will correspond to different antenna ports 10 if they are being-formed with different weights, since the corresponding effective channels will be different.

The terminal node 110 as illustrated in FIG. 4A comprises reception circuitry 30 arranged to:
 a) i) configure a first antenna port $10_1$ to receive a first positioning reference signal ($PRS_1$) from a first transmission reception point (not illustrated) of the network,
  ii) determine a time of arrival (TOA) for the first positioning reference signal ($PRS_1$) and
  iii) measure a received signal quality (RSQ) metric $20_1$ of the first positioning reference signal ($PRS_1$) for the first antenna port $10_1$.
The reception circuitry 30 is also arranged to:
 b) i) configure a second antenna port $10_2$ to receive a second positioning reference signal ($PRS_2$) from a second transmission reception point (not illustrated) of the network,
  ii) determine a time of arrival (TOA) for the second positioning reference signal ($PRS_2$) and
  iii) measure a received signal quality (RSQ) metric $20_2$ of the second positioning reference signal ($PRS_2$) for the second antenna port $10_2$.

As illustrated in FIG. 4B, at block 210, the terminal node 110, in response to the received signal quality (RSQ) decision, made at block 208, can not only inform the network but can subsequently switch reception of the first positioning reference signal ($PRS_1$) from the first antenna port $10_1$ to the third antenna port $10_3$. This can improve the received signal quality (RSQ) metric $20_1$ for the first positioning reference signal ($PRS_1$). The terminal node 110 can continue performing the method 200.

The terminal node 110 as illustrated in FIG. 4B comprises reception circuitry 30 that is now arranged to:
 a) i) configure a third antenna port 103 to receive a first positioning reference signal ($PRS_1$) from a first transmission reception point (not illustrated) of the network,
  ii) determine a time of arrival (TOA) for the first positioning reference signal ($PRS_1$) and
  iii) measure a received signal quality (RSQ) metric $20_1$ of the first positioning reference signal ($PRS_1$) for the first antenna port $10_1$.
The reception circuitry 30 is still arranged to:
 b) i) configure a second antenna port $10_2$ to receive a second positioning reference signal ($PRS_2$) from a second transmission reception point (not illustrated) of the network,
  ii) determine a time of arrival (TOA) for the second positioning reference signal ($PRS_2$) and
  iii) measure a received signal quality (RSQ) metric $20_2$ of the second positioning reference signal ($PRS_2$) for the second antenna port $10_2$.

The first antenna port $10_1$ defines a first reception chain associated with a first antenna panel and the second antenna port $10_2$ defines a second reception chain associated with a second antenna panel. The first antenna panel and the second antenna panel can be the same antenna panel or they can be different antenna panels.

Figure 5A:
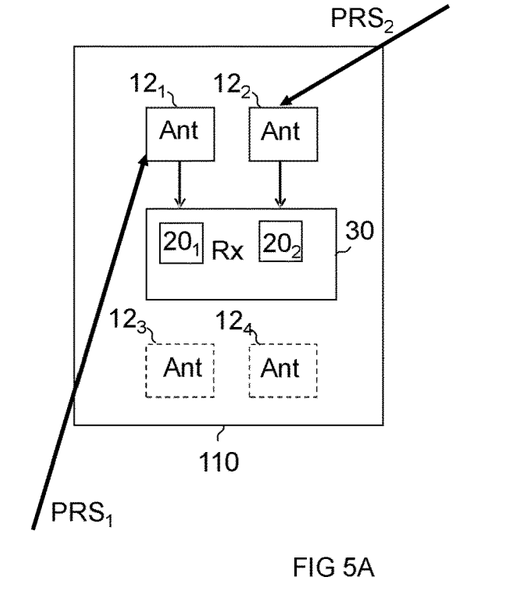
FIGS. 5A, 5B show another example of the subject matter described herein.
Figure 5B:
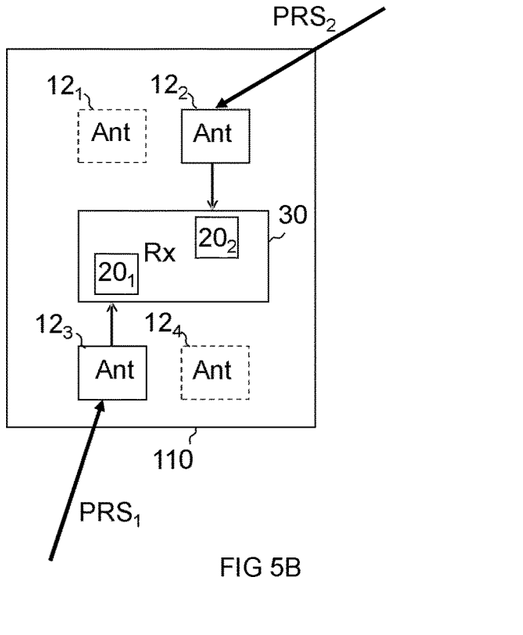

FIGS. 5A and 5B illustrate an example in which the first antenna panel and the second antenna panel are different antenna panels.

FIGS. 5A and 5B illustrate a terminal node 110 that comprises multiple antenna panels 12. In the example illustrated in FIG. 5A, a first antenna panel $12_1$ receives a first positioning reference signal ($PRS_1$) and a different, second antenna panel $12_2$ receives a second positioning reference signal ($PRS_2$). In FIG. 5B, a third antenna panel $12_3$ which is different to the first antenna panel $12_1$ and the second antenna panel $12_2$ is used to receive the first positioning reference signal ($PRS_1$). The second antenna panel $12_2$ is still used to receive the second positioning reference signal ($PRS_2$).

In FIGS. 5A and 5B the operational antenna panels are shown with solid lines and the non-operational antenna panels are illustrated using dashed lines. It can be seen that the first antenna panel $12_1$ and the second antenna panel $12_2$ are both used in FIG. 5A but that the third antenna panel $12_3$ and the fourth antenna panel $12_4$ are not used in FIG. 5A. However, in FIG. 5B the second antenna panel $12_2$ and the third antenna panel $12_3$ are used, whereas the first antenna panel $12_1$ and the fourth antenna panel $12_4$ are not used.

Referring to FIG. 5A, it will therefore be appreciated that the mobile terminal 110 comprises reception circuitry 30 that is configured to configure a first reception chain associated with a first antenna panel $12_1$ to:

i) receive a first positioning reference signal ($PRS_1$) from a first transmission reception point (not illustrated) of the network, ii) determine a time arrival (TOA) for the first positioning reference signal ($PRS_1$), and iii) measure a received signal quality (RSQ) metric $20_1$ of the first positioning reference signal ($PRS_1$) at the first antenna panel $12_1$.

The reception circuitry 30 is configured to configure a second reception chain associated with a second antenna panel $12_2$ to:

i) receive a second positioning reference signal ($PRS_2$) from a second transmission reception point (not illustrated) of the network, ii) determine a time arrival (TOA) for the second positioning reference signal ($PRS_2$), and iii) measure a received signal quality (RSQ) metric $20_2$ of the second positioning reference signal ($PRS_2$) at the first antenna panel $12_1$.

It can be seen that the reception of the first positioning reference signal ($PRS_1$) has switched from occurring at the first antenna panel $12_1$ in FIG. 5A to occurring at the third antenna panel $12_3$ in FIG. 5B. As illustrated in FIG. 5B and with reference to FIG. 3A, at block 210, the terminal node 110, in response to the received signal quality (RSQ) decision, made at block 208, can not only inform the network but can subsequently switch reception of the first positioning reference signal ($PRS_1$) from the first antenna panel $12_1$ to the third antenna panel $12_3$. This can improve the received signal quality (RSQ) metric $20_1$ for the first positioning reference signal ($PRS_1$). The terminal node 110 can continue performing the method 200.

Referring to FIG. 5B, it will therefore be appreciated that the mobile terminal 110 comprises reception circuitry 30 that is configured to configure a third reception chain associated with a third antenna panel $12_3$ to:

i) receive a first positioning reference signal ($PRS_1$) from a first transmission reception point (not illustrated) of the network, ii) determine a time arrival (TOA) for the first positioning reference signal ($PRS_1$), and iii) measure a received signal quality (RSQ) metric $20_1$ of the first positioning reference signal ($PRS_1$) at the first antenna panel $12_1$.

The reception circuitry 30 is still configured to configure the second reception chain associated with a second antenna panel $12_2$ to:

i) receive the second positioning reference signal ($PRS_2$) from the second transmission reception point (not illustrated) of the network, ii) determine a time arrival (TOA) for the second positioning reference signal ($PRS_2$), and iii) measure a received signal quality (RSQ) metric $20_2$ of the second positioning reference signal ($PRS_2$) at the first antenna panel $12_1$.

In the example illustrated in FIGS. 5A and 5B, the second antenna panel $12_2$ is a different antenna panel than the first antenna panel.

Figure 6A:
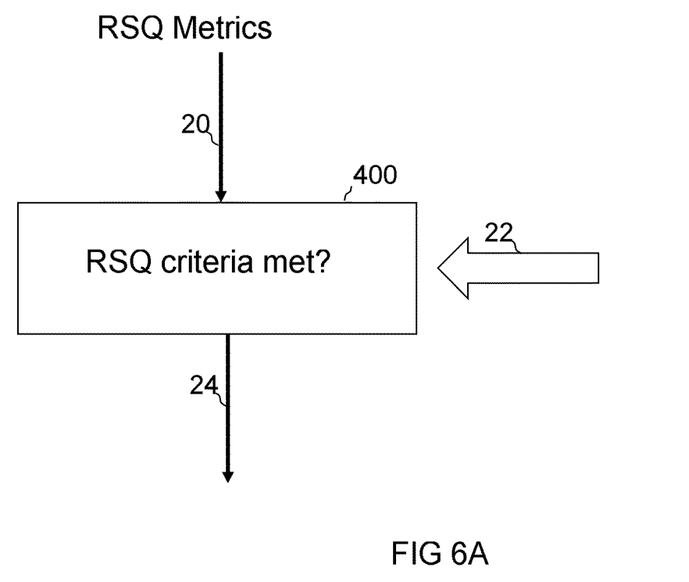
FIG. 6A shows another example of the subject matter described herein.
Figure 6B:
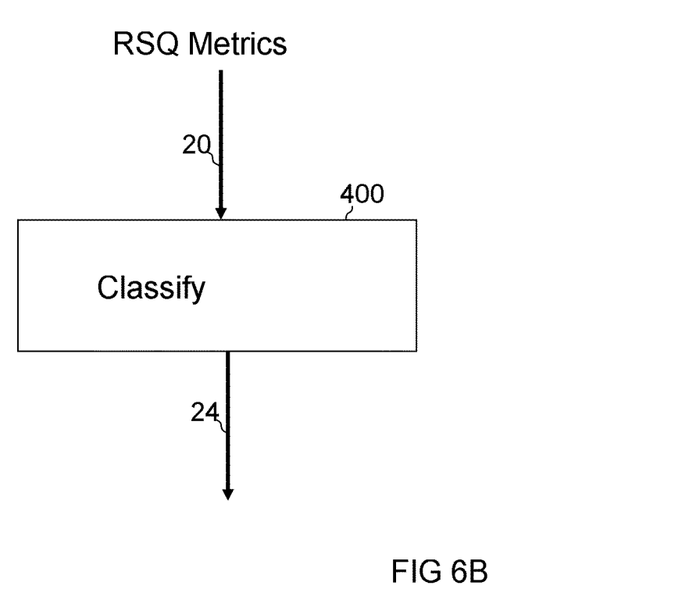
FIG. 6B shows another example of the subject matter described herein.

FIGS. 6A and 6B illustrate different examples of processing the multiple respective received signal quality (RSQ) metrics 20 for the multiple received positioning reference signals (PRSs), to trigger a received signal quality (RSQ) decision 24 at the terminal node 110. These figures therefore correspond to block 208 of FIG. 3A.

In the example of FIG. 6A, the terminal node 110 has processing means 400 for determining whether a received signal quality (RSQ) criteria or criterion have been met.

In the example illustrated, the received signal quality (RSQ) criteria is dependent upon one or more thresholds 22. The one or more thresholds 22 can, for example, be received from the network 100.

The processing means 400 can, for example, process, the multiple respective received signal quality (RSQ) metrics 20 for the multiple received positioning reference signals (PRSs), to trigger a received signal quality (RSQ) decision by classifying each of the multiple position references signals (PRSs)/multiple respective signal quality (RSQ) metrics into at least one or more of the following classes:

i) a good quality signal (high quality), ii) a signal quality that requires improvement (medium quality), iii) a poor quality signal (low quality).

For example, if the received signal quality (RSQ) metric 20 for an associated positioning reference signal (PRS) exceeds a first threshold then the associated positioning reference signal can be classified as a good quality signal. If, however, the received signal quality (RSQ) metric does not exceed the first threshold but does exceed a second lower threshold then the associated positioning reference signal can be classified as having a signal quality that requires improvement. If the received signal quality (RSQ) metric 20 is below the second threshold, then the associated positioning reference signal (PRS) can be classified as a poor quality signal.

It may also be possible by processing a received signal quality (RSQ) metric for one or more of the received positioning reference signals (PRSs) to identify one or more received positioning reference signals (PRS) as an interfering signal that is interfering with another positioning reference signal (PRS) and negatively affecting its received signal quality (RSQ) metric 20.

FIG. 6B illustrates an example in which the terminal node 110 comprises processing means 400 for performing block 208 of FIG. 3A, that is, processing the multiple respective received signal quality (RSQ) metrics 20 for the multiple received positioning reference signals (PRSs), to trigger a received signal quality (RSQ) decision 24. This processing comprises classifying the multiple positioning reference signals (PRSs) into at least one or more classes. The classes can, for example, classify the positioning reference signal (PRS) associated with a received signal quality (RSQ) metric as good, requires improvement, poor. The processing means 400 in this example can, for example, use machine learning. It can for example be a trained neural network.

In the examples of FIGS. 6A and 6B, the output of the processing step 24 can, for example, be a determination that at least one or more of the positioning reference signals (PRSs) is classified as a good quality signal, a signal quality that requires improvement or a poor quality signal.

The terminal node 110, at block 210 of FIG. 3A can inform the network in response to the received signal quality (RSQ) decision 24. For example, the terminal node 110 can send one or more messages identifying at least one or more positioning reference signals (PRSs) as at least having a good quality signal, or having a quality signal that requires improvement or having a poor quality signal, or as an interfering signal.

Where a positioning reference signal (PRS) is classified as requiring improvement, the terminal node 110 can provide to the network additional information to assist a network decision in relation to that positioning reference signal (PRS).

Where the classification of a positioning reference signal (PRS) is as a poor quality signal, the terminal node 110 can request a change of antenna port or antenna panel or request a change of positioning reference signal.

Where a positioning reference signal (PRS) is identified as an interfering signal, the terminal node 110 can identify M of the strongest interference signals. This can be an implicit or explicit request to mute these interferers.

In order to allow the network 100 to respond appropriately, the communication to the network can not only provides a classification of a positioning reference signal (PRS) but also provide explicitly an identity of the positioning reference signal (PRS).

The results 24 of the processing step 208 that are sent at block 210, to inform the network 100 can, for example, be sent to a serving transmission reception point or a serving access node 120. For example, the informing may occur via layer 1 (PHY), layer 2 (MAC) or via layer 3 (RRC) messaging. Where layer 1 messaging is used the message can, for example, be sent via the physical uplink control channel (PUCCH) or via the physical uplink shared channel (PUSCH).

The network 100 can, for example, respond to the informing, that originates from the terminal node 110, in response to the received signal quality (RSQ) decision (block 210, FIG. 3). The network 100 can, for example, adapt transmission in the network (block 226, FIG. 3B).

For example, the network 100 can respond by adapting transmission of one or more positioning reference signals (PRSs) from respective transmission reception points (TRPs) of the network.

For example, in some examples the network 100 can cause an increase in a repetition factor of a particular positioning reference signal (PRS). A repetition factor is a number of times a particular positioning reference signal (PRS) is transmitted to the terminal node 110 in a time period.

For example, the network 100 can cause a reduction in repetition gap of a particular positioning reference signal (PRS). A repetition gap is a time offset between adjacent transmissions of the particular positioning reference signal (PRS) to the terminal node 110 in a time period (if reduction is possible).

In some examples, the network 100 may cause muting of the positioning reference signal resources, for example, to reduce interference.

In some examples, the network 10 may cause allocation of periodic or additional aperiodic positioning reference signal resources or otherwise change the allocated positioning reference signal resources used for the terminal node 110.

In some examples, the network 100 causes periodic transmission of the positioning reference signals (PRSs) and the time period used for the definition of the repetition factor and the repetition gap is the time period as defined by the periodic transmission.

In 3GPP, the UE 110 measurement for Observed Time Difference Of Arrival (OTDOA) is the Reference Signal Time Difference (RSTD). The RSTD is the relative timing difference between a reference PRS and a measured PRS calculated as the smallest time difference between corresponding subframe boundaries of the reference PRS and the measured PRS. In 3GPP, a PRS is a pseudo-random QPSK sequence that can be shifted in time and frequency. A PRS is generated for a specific slot in the radio frame. PRS are transmitted in pre-defined positioning subframes. A group of $N_{PRS}$ consecutive subframes is a positioning occasion. The positioning occasions occur periodically with periodicity $T_{PRS}$. $N_{PRS}$ and $T_{PRS}$ are network controlled parameters. The PRS in a positioning occasion are transmitted with constant power. PRSs in certain positioning occasions can be transmitted with zero power (PRS muting). The PRS occasions at all TRPs are aligned in time and use the same $N_{PRS}$ and $T_{PRS}$. A particular PRS uses particular PRS resources. These can include a repeating time-frequency mapping pattern to resource blocks.

A location management function (LMF) is the network entity in the 5G Core Network (5GC) supporting positioning. The TRP can be a remote radio head, a distributed antenna, or a repeater or other network node.

In 3GPP a UE 110 can be configured with one or more DL PRS resource set configuration(s) as indicated by the higher layer parameters nr-DL-PRS-ResourceSet-r16 and nr-DL-PRS-Resource-r16. Each DL PRS resource set consists of K≥1 DL PRS resource(s) where each has an associated spatial transmission filter Each DL PRS resource corresponds to a PRS.

The UE 110 can be configured with one or more DL PRS positioning frequency layer configuration(s) as indicated by the higher layer parameter nr-DL-PRS-PositioningFrequencyLayer-r16. A DL PRS positioning frequency layer is defined as a collection of DL PRS resource sets which have common parameters configured by nr-DL-PRS-PositioningFrequencyLayer-r16.

The UE 110 is configured with dl-PRS-ID-r16 each of which is defined such that it is associated with multiple DL PRS resource sets from the same cell. One of these dl-PRS-ID-r16 along with a nr-DL-PRS-ResourceSetId-r16 and a nr-DL-PRS-ResourceId-r16 can be used to uniquely identify a DL PRS resource.

A DL PRS resource set consists of one or more DL PRS resources and it is defined by:

nr-DL-PRS-ResourceSetId-r16 defines the identity of the DL PRS resource set configuration.

dl-PRS-Periodicity-and-ResourceSetSlotOffset-r16 defines the DL PRS resource periodicity.

dl-PRS-ResourceRepetitionFactor-r16 defines how many times each DL-PRS resource is repeated for a single instance of the DL-PRS resource set.

dl-PRS-ResourceTimeGap-r16 defines the offset in number of slots between two repeated instances of a DL PRS resource with the same nr-DL-PRS-ResourceSetId-r16 within a single instance of the DL PRS resource set.

dl-PRS-MutingPatternList-r16 defines the time locations where the DL PRS resource is expected to not be transmitted for a DL PRS resource set.

A DL PRS resource is defined by:

dl-PRS-ResourceList-r16 determines the DL PRS resources that are contained within one DL PRS resource set.

nr-DL-PRS-ResourceId-r16 determines the DL PRS resource configuration identity.

dl-PRS-SequenceId-r16 is used to initialize $c_{init}$ value used in pseudo random generator for generation of DL PRS sequence for a given DL PRS resource.

In the preceding example, and the examples below, instead of merely measuring and reporting the UE 110 makes a decision at block 208 of FIG. 3.

In one embodiment, the UE 110 obtains preconfigured triggering conditions for DL PRS transmission adaptation, which are determined for UE beam/antenna panel specific measurements associated with PRS resources with multiple TRPs/cells based on RSRP and/or SINR, for example as follows:

Measurement Quality Condition 1 for RSRP:

When UE 110 performs beam/antenna panel specific RSTD positioning measurements with the reference signal received power (RSRP) quality metric (two RSRP values associated to determine start time of one subframe from a reference positioning node and another positioning node) and the RSRP values of PRS resources are less than a configured power threshold 1 and above a power threshold 2:

UE 110 shall:
- determine resource ID(s) and/or resource set ID(s) associated with DL PRS resource(s) (PRSs) being below configured threshold 1 and above power threshold 2 and trigger DL PRS transmission adaptation request with determined PRS resource IDs or resource set IDs e.g. via PUCCH/PUSCH.
- Additionally, If the configured time offset (i.e. 'DL-PRS-ResourceTimeGap') between repeated resources for a resource sets is ≥2, the request message indicates for the network to reduce the value of time offset for determined resources. The value for the decrease of time gap shall always be less than the existing configured value. For example, if currently configured value is set to 8, the UE can request values 4 or 2 or 1
- UE 110 can additionally trigger PRS transmission adaptation request with additional set of aperiodic DL PRS resources with repetition factor associated with determined resource IDs or resource set IDs
- UE can additionally trigger DL PRS adaptation request to increase the value of resource repetition factor (i.e. 'DL-PRS-ResourceRepetitionFactor') associated with determined PRS resource ID Measurement Quality Condition 2 for RSRP:

When UE performs beam/antenna panel specific RSTD positioning measurements with the reference signal received power (RSRP) quality metric and the value of RSRP is less than power threshold 2, UE determines its resource ID or resource ID and triggers PRS adaptation request message to request for extra PRS measurement gap. This extra measurement gap in time is required to activate another UE RX antenna panel for the RSTD measurement. This indication can be associated with X ms preconfigured minimum time delay to initiate next RSTD measurement with another antenna panel at UE-side.

Measurement Quality Condition 1 for SINR:

When UE 110 performs beam/antenna panel specific RSTD positioning measurements with the signal-to-noise-and-interference (SINR) quality metric (two SINR values associated with start time of one subframe from a reference positioning node and another positioning node) and the SINR values of PRS resources with or without dedicated interference resources are below configured SINR threshold 1 and above SINR threshold 2 UE 110 shall:

a) UE procedure with dedicated (configured) interference resources: Network/LMF may have explicitly configured a dedicated set of DL PRS resource(s) or resource set(s) for interference measurements associated with beam/antenna panel specific RSTD measurements.

If only one DL PRS resource or DL PRS set for interference is configured, UE shall implicitly use this as interference resource for SINR computation associated with RSTD measurement. Otherwise, UE shall assume that separate DL PRS interference resources or DL PRS interference resource sets for RSTD measurements are explicitly configured.

Based on configured PRS resources for RSTD measurements and additional dedicated PRS resources for interference, channel and interference power estimates for each RSTD measurement shall be computed at UE as:

Intended channel power (S) is computed based on DL PRS resources assigned for reference positioning node/TRP/gNB and another positioning node/TRP/gNB.

Interference and noise power (IN) is computed based on dedicated DL PRS resources associated with interference assigned for reference positioning node/TRP/gNB and another positioning node/TRP/gNB. UE shall assume that DL PRS resources for RSTD and DL PRS resources for interference measurement are spatially QCL:ed with each other (QCL-typeD). Based on interference channel and interference and noise power, SINR values (SINR=S/IN) are computed.

UE determines interference PRS resource indices(s) associated with SINR values and determines at the maximum M-strongest interferers in terms of estimated interference power, where the value of M is configured by the network.

Network can configure also a separate interference power threshold to identify M-strongest interferers being above the separately configured interference power threshold.

UE triggers DL PRS adaptation request message via PUCCH/PUSCH for the network to mute M-strongest determined interferer associated with their DL PRS resource indice(s)/resource set indice(s).

b) UE procedure with common (in-channel) interference resources:

UE 110 shall implicitly assume that interference estimates for SINR computation are obtained based on common PRS resources (for both channel and interference) used to determine the start of one subframe from a reference positioning node and another positioning node in RSTD measurement.

The intended channel power (S) is computed based on DL PRS resources assigned for reference positioning node/TRP/gNB and another positioning node/TRP/gNB Interference and noise power (IN) is computed by using common/same DL PRS resources used for intended channel power computation. UE shall compute interference and noise power by subtracting PRS resource based channel estimates (intended channel) multiplied with a known PRS sequence (intended channel) from a received DL PRS resource and squaring the result of it (interference power).

UE determines channel PRS resource indices(s) associated with SINR values that are less than the configured SINR-threshold.

UE triggers DL PRS adaptation request message via PUCCH/PUSCH for the network/LMF to mute interferers that are associated with determined PRS channel resource indice(s)/resource set indice(s).

The target of this request is to indicate the network/LMF that an interference level is above configured threshold and some interference needs to reduced. Since interfering PRS resources are not explicitly known at the UE, it is up to the network/LMF to determine which PRS resources are muted.

Measurement Quality Condition 2 for SINR:

When the UE performs beam/antenna panel specific RSTD positioning measurements with SINR quality metric and the value of SINR is below SINR threshold 2, UE determines its channel resource ID or resource ID and triggers PRS adaptation request message to request for extra PRS measurement gap. This extra measurement gap in time is required to activate another UE RX antenna panel for the RSTD measurement. This indication can be associated with X ms preconfigured minimum time delay to initiate next RSTD measurement with another antenna panel at UE-side.

Transmission Adaptation Request Message:

In some embodiments, beam and/or antenna panel specific PRS transmission adaptation request message can consist of at least one of the elements Resource ID: Resource set ID and/or resource ID which indicates which of the PRS resource set(s) or resource (s) are requested to be adapted Time offset adaptation: Offset to indicate decrease/increase existing offset value. This can be presented as bit vector length of M, where M−1 LSBs of the vector are reserved to indicate index offset with respect to currently configured value. Additionally, the MSB of the bit vector determines whether to increase (=1) or decrease (=0) existing value with aforementioned offset, increase/decrease is defined as slots/symbols.

number of additional aperiodic PRS resources: number of additional aperiodic PRS resources similar as configured one for the measurement. This can be a bit vector with length K, where each element of this vector can mapped to the number of preconfigured aperiodic resources. For example, K=2, first element is mapped to 1 extra aperiodic resource and the second element mapped to two aperiodic resources—When the value of element is set to one, the corresponding preconfigured mapped value is requested from network. When the value of the element is set to zero, the corresponding preconfigured value is not requested from the network.

Repetition factor adaptation: Offset to indicate decrease/increase existing repetition value. This can be presented as bit vector length of L, where L−1 LSBs of the vector are reserved to indicate index offset with respect to currently configured value. Additionally, the MSB of the bit vector determines whether to increase (=1) or decrease (=0) existing value with aforementioned repetition factor.

Muted PRS resource IDs: M-strongest interfering PRS resource indices or PRS resource set IDs Use of another RX antenna panel: Binary valued information, i.e. 0 or 1. (1=UE needs extra time to activate another UE RX antenna panel, 0=UE does not need any extra time)

Figure 7:
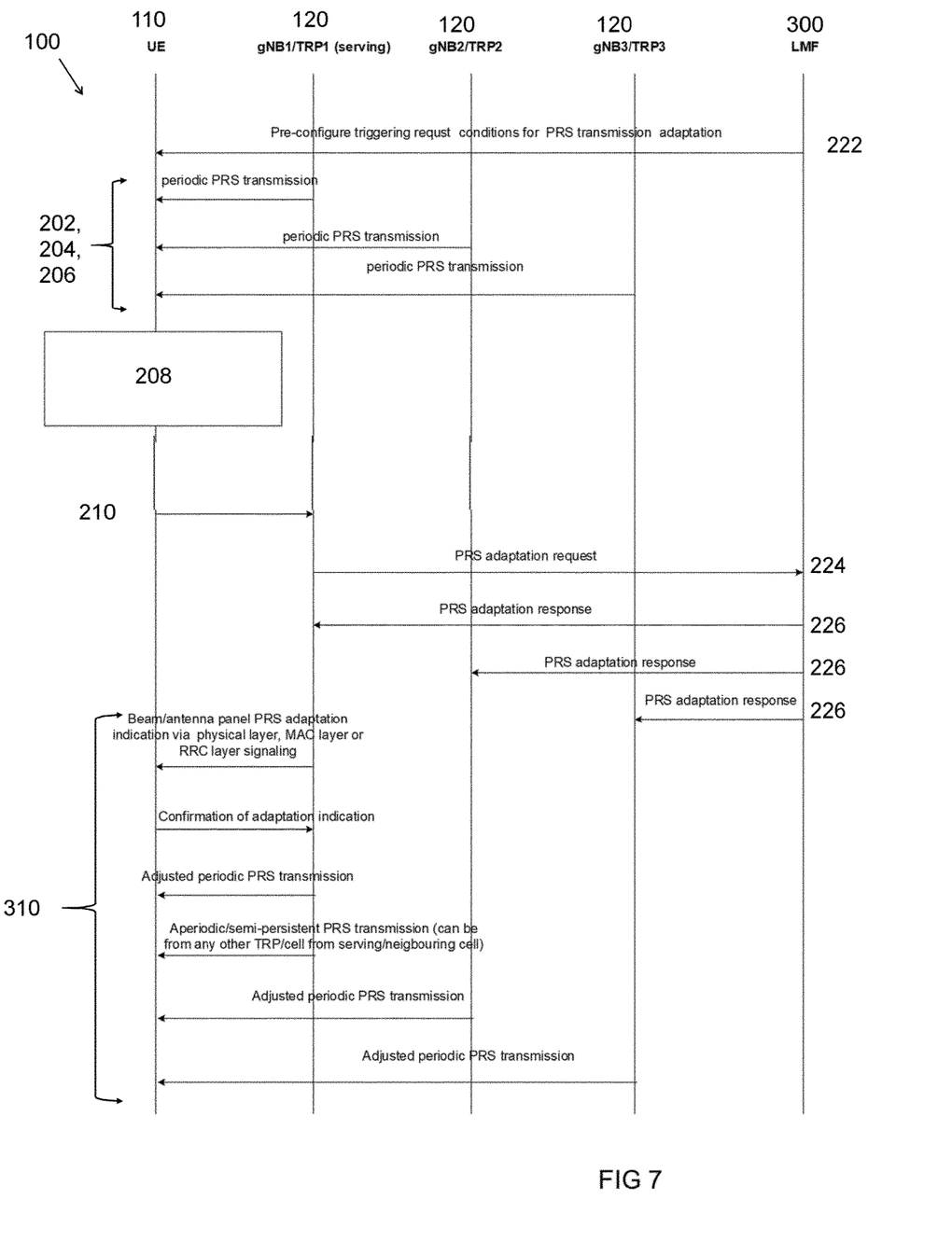
FIG. 7 shows another example of the subject matter described herein.

FIG. 7 shows an example of overall signalling flow-diagram between different network nodes for DL PRS transmission adaptation request. It is assumed that all signalling for the configuration of positioning session for UE 110 has been already done before periodic DL PRS transmission.

The FIG maps the blocks of FIGS. 3A and 3B to a 3GPP implementation.

At block 222, the LMF 300 enables transmission of multiple positioning reference signals from respective transmission reception points of a network. LMF 300 preconfigures via new radio positioning protocol (NR-PP) triggering conditions for PRS adaptation request. Then, all three different gNBs/TRPs are able to start the transmission of periodic PRS with repeated resources for positioning measurements at UE-side.

At block 202, the terminal node 110 receives multiple positioning reference signals transmitted from respective transmission reception points of the network.

At block 204, the terminal node 110 determines time of arrival of the multiple positioning reference signals received from the respective transmission reception points.

At block 206, the terminal node 110 measures at least a received signal quality metric for the multiple received positioning reference signals.

At block 208, the terminal node 110 processes, at least the multiple respective received signal quality metrics for the multiple received positioning reference signals, to trigger a received signal quality decision.

At block 210, the terminal node 110 in response to the received signal quality decision, informs the network.

When UE performs beam/antenna panel specific positioning measurements, e.g. reference signal time difference (RSTD), it evaluates preconfigured PRS triggering conditions for a triggering of DL PRS transmission adaptation request message.

For example, when an accumulated received signal quality (e.g. L1-RSRP) of repeated PRS resource instances over a configured resource time offset (i.e. 'DL-PRS-Resource-TimeGap') is smaller than a configured power threshold and the configured resource time offset is larger than two, UE shall determine resource ID and/or resource set ID and/or and trigger PRS transmission adaptation request to reduce the value of the configured time offset with respect to existing value.

The UE can also request additional set of aperiodic DL PRS resources with repetition factor associated with determined resource ID or resource set ID.

The UE can request to increase the value of repetition factor associated with determined resource ID or resource set.

When the UE informs the network (block 210), it can be via RRC and/or MAC and/or physical layer signalling (e.g. PUCCH/PUSCH) to serving or neighbouring TRP/gNB.

The spatial target for the request message can be configured with implicit or explicit way. When the spatial source of the request message for PRS adaptation is configured with implicit way, UE can assume that the spatial source for the triggering message including its potential reference signal is associated with the last (latest) strongest in terms of L1-RSRP or L1-SINR reported DL PRS resource of the serving cell. When the spatial source for the request message is explicitly configured by the network, any DL/UL reference signal or signal (e.g. DL SSB, PRS, DMRS of PDCCH/PDSCH, PTRS, TRS, NZP-CSI-RS for BM, NZP-CSI-RS for mobility, UL SRS, DMRS of PUCCH/PUSCH) associated with serving or neighbouring TRP/cell can be configured to work as spatial source for the request message and its associated reference signal.

At block 224, the LMF 300 is informed of a received signal quality (RSQ) decision made at the terminal node 110 in respect of measured received signal quality metrics for the transmitted positioning reference signals received at the terminal node. The serving node/TRP/gNB delivers request message to the LMF based on which the LMF determines whether to adapt or not DL PRS transmission.

At block 226, the LMF 300 enables, in response to being informed of a received signal quality (RSQ) decision made at the terminal node 110 in respect of measured received signal quality metrics for the transmitted positioning reference signals received at the terminal node, causing adaptation 310 of transmission of signals in the network. Network/LMF has always a right to decide whether to adapt PRS transmission or not for subsequent DL PRS transmissions. LMF always defines the modification of DL PRS resources and sends out the PRS transmission adaptation response to involved TRPs/gNBs to the serving and neighbouring cells to modify DL PRS resource transmissions accordingly. Depending on the LMF decision about PRS resource adaptation, the serving TRP/gNB indicates via physical layer and/or MAC layer and/or RRC layer signalling to UE about the reconfigured DL PRS transmissions as well as potential scheduling decisions for aperiodic PRS transmissions.

The benefits of the proposed implementation is that there is now dynamic adaptation of DL PRS transmission according to configured quality metric (e.g. RSRP and/or SINR) associated with RSTD measurements. As a result of this, higher accuracy positioning with OTDOA can be achieved in multi-TRP deployment with multi-beam DL transmission and UEs equipped with multiple antenna panels.

Where a structural feature has been described, it may be replaced by means for performing one or more of the functions of the structural feature whether that function or those functions are explicitly or implicitly described.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

In will be appreciated that a terminal node (e.g. UE) 110 for a radio network 110 can comprise means for:
  receiving 202 multiple positioning reference signals (PRSs) transmitted from respective transmission reception points (TRPs) of a network 100;
  determining 204 time of arrival (TOA) of the multiple positioning reference signals (PRSs) received from the respective transmission reception points (TRPs);
  measuring 206 at least a received signal quality (RSQ) metric for the multiple received positioning reference signals (PRSs);
  processing 208, at least the multiple respective received signal quality (RSQ) metrics for the multiple received positioning reference signals (PRSs), to trigger a received signal quality decision; and
  in response to the received signal quality decision, informing 210 the network 100.

In will be appreciated that a node 300 of a radio network 100 can comprise means for: enabling transmission of multiple positioning reference signals (PRSs) from respective transmission reception points (TRPs) of a network 100;
  being informed 224 of a received signal quality (RSQ) decision made at a terminal node 110 of the network 100 in respect of measured received signal quality (RSQ) metrics for the transmitted positioning reference signals (PRSs) received at the terminal node 110; and
  in response, causing 226 adaptation 310 of transmission of signals in the network 100.

The adaptation of transmission of signals in the network can, for example, be an adaptation of PRS signals in the network 100.

The adaptation of transmission of signals in the network can, for example, be for improving reception of positioning reference signals from transmission reception points of the network.

The adaptation of transmission of signals in the network can, for example, comprise one or more of:
  causing an increase of a repetition factor of a particular positioning reference signal,
  where the repetition factor is a number of times the particular positioning reference signal is transmitted to the terminal node in a time period,
  causing a reduction of a repetition gap of a particular positioning reference signal, where the repetition gap is a time offset between adjacent transmissions of the particular positioning reference signal to the terminal node in a time period,
  causing muting of positioning reference signals,
  causing allocation of aperiodic positioning reference signal resources,
  causing adaptation of interfering transmissions in the network.

Figure 8:
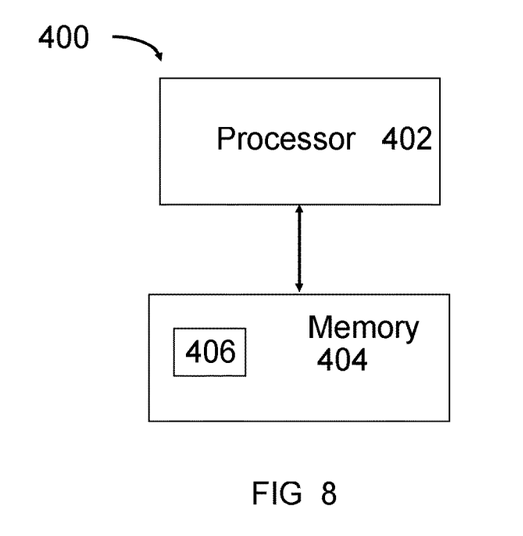
FIG. 8 shows another example of the subject matter described herein.

FIG. 8 illustrates an example of a controller 400. The controller can be used in an apparatus, for example, a node 110, 120, 300 of the network 100.

Implementation of a controller 400 may be as controller circuitry. The controller 400 may be implemented in hardware alone, have certain aspects in software including firmware alone or can be a combination of hardware and software (including firmware).

As illustrated in FIG. 8 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus when loaded into the processor 402. The computer program instructions, of the computer program 406, provide the logic and routines that enables the apparatus to perform the methods illustrated in FIGS. 2 to 7. The processor 402 by reading the memory 404 is able to load and execute the computer program 406.

The apparatus 110 can therefore comprise:
  at least one processor 402; and
  at least one memory 404 including computer program code
  the at least one memory 404 and the computer program code configured to, with the at least one processor 402, cause the apparatus 110 at least to perform:
  processing, at least multiple respective received signal quality metrics for multiple received positioning reference signals, to trigger a received signal quality decision,
  wherein the multiple respective received signal quality metrics are measured from respective multiple received positioning reference signals transmitted from respective reference points of a network for respective time of arrival determination; and
  in response to the received signal quality decision, informing the network The apparatus 300 can therefore comprise:
  at least one processor 402; and
  at least one memory 404 including computer program code
  the at least one memory 404 and the computer program code configured to, with the at least one processor 402, cause the apparatus 110 at least to perform:
  adaptation of transmission of signals in the network, in response to being informed of a received signal quality decision made at the terminal node in respect of measured received signal quality metrics for multiple transmitted positioning reference signals,
transmitted from multiple respective transmission reception points of the network.

Figure 9:
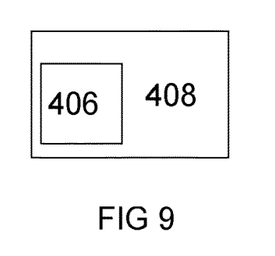
FIG. 9 shows another example of the subject matter described herein.

As illustrated in FIG. 9, the computer program 406 may arrive at the apparatus via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 406. The delivery mechanism may be a signal configured to reliably transfer the computer program 406. The apparatus may propagate or transmit the computer program 406 as a computer data signal.

Computer program instructions for causing an apparatus 110 to perform at least the following or for performing at least the following:
  processing, at least multiple respective received signal quality metrics for multiple received positioning reference signals, to trigger a received signal quality decision,
  wherein the multiple respective received signal quality metrics are measured from respective multiple received positioning reference signals transmitted from respective reference points of a network for respective time of arrival determination; and
  in response to the received signal quality decision, informing the network.

Computer program instructions for causing an apparatus 300 to perform at least the following or for performing at least the following:
  adaptation of transmission of signals in the network, in response to being informed of a received signal quality decision made at a terminal node of a network in respect of measured received signal quality metrics for multiple transmitted positioning reference signals, transmitted from multiple respective transmission reception points of the network.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
  (a) hardware-only circuitry implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions and
  (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIG. 3A may represent steps in a method and/or sections of code in the computer program 406. The blocks illustrated in the FIG. 3B may represent steps in a method and/or sections of code in the computer program 406.

The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising at least one processor; and at least one memory including computer program code
the at least one memory and the computer program code configured to, with the at least one processor, cause the apparatus at least to perform:
receiving multiple positioning reference signals transmitted from respective transmission reception points of a network;
determining time of arrival of the multiple positioning reference signals received from the respective transmission reception points, wherein the time of arrival is determined at a subframe;
measuring at least a received signal quality metric for the multiple received positioning reference signals, wherein the received signal quality metric for a positioning reference signal is dependent upon a reference signal received power for the positioning reference signal and a signal to interference noise ratio for the positioning reference signal;
processing, at least the multiple respective received signal quality metrics for the multiple received positioning reference signals, to trigger a received signal quality decision, wherein processing comprises determining whether a received signal quality criterion or criteria have been met, and wherein processing further comprises classifying the multiple positioning reference signals into at least one or more of the following classes in which a received signal quality metric for the positioning reference signal is at least one of:
i) above a first threshold,
ii) below the first threshold and above a second threshold, or
iii) below the second threshold;
in response to the received signal quality decision, informing the network, wherein informing the network comprises requesting adaptation of at least one positioning reference signal, wherein requesting adaptation comprises a resource identification, a time offset adaptation, a repetition factor adaptation, and a muted positioning reference signal resource identification, and wherein informing the network further comprises identifying at least one or more positioning reference signals as being:
good quality,
requiring improvement,
poor quality, and
interfering;
configuring a first antenna port to receive a first positioning reference signal from a first transmission reception point of the network, determining a time of arrival for the first positioning reference signal, and measuring a received signal quality metric of the first positioning reference signal for the first antenna port, wherein the triggered received signal quality decision causes the apparatus to switch from using a first antenna panel connected to a first antenna port of the apparatus for the first positioning reference signal to using a different antenna panel for the first positioning reference signal; and
configuring a second antenna port to receive a second positioning reference signal from a second transmission reception point of the network, determining a time of arrival for the second positioning reference signal, and measuring a received signal quality metric of the second positioning reference signal for the second antenna port, wherein the triggered received signal quality decision causes the apparatus to switch from using a second antenna panel connected to a second antenna port of the apparatus for the second positioning reference signal to using a different antenna panel for the second positioning reference signal, wherein the apparatus receives the first positioning reference signal via a third antenna port which is different from the first antenna port, and wherein the apparatus receives the second positioning reference signal via the second antenna port.

* * * * *